United States Patent [19]

Sanchez et al.

[11] Patent Number: 5,552,510
[45] Date of Patent: Sep. 3, 1996

[54] OXIRANE AND DIOXOLANE COPOLYMERS, PROCESS FOR THEIR PREPARATION AND IONIC CONDUCTION MATERIALS CONTAINING SAME

[75] Inventors: Jean-Yves Sanchez, Saint-Ismier; Michel Armand, Saint-Martin-D'Uriage; Jean-Pierre Petit, Biviers, all of France; Yves Choquette, Saint-Julie, Canada; Glaura Goulart Silva, Belo-Horizonte, Brazil

[73] Assignees: Centre National De La Recherche Scientifique, Paris, France; Hydro-Quebec, Montreal, Canada

[21] Appl. No.: 193,134

[22] PCT Filed: Jul. 7, 1993

[86] PCT No.: PCT/FR93/00701

§ 371 Date: May 27, 1994

§ 102(e) Date: May 27, 1994

[87] PCT Pub. No.: WO94/02534

PCT Pub. Date: Feb. 3, 1994

[30] Foreign Application Priority Data

Jul. 15, 1992 [FR] France ................... 92 08716

[51] Int. Cl.⁶ .................. C08G 2/22; C08G 2/26
[52] U.S. Cl. ................ 528/250; 528/408; 528/421
[58] Field of Search .................. 528/408, 421, 528/232, 250

[56] References Cited

U.S. PATENT DOCUMENTS

| | | | |
|---|---|---|---|
| 3,275,604 | 9/1966 | Kray | 528/250 |
| 4,683,181 | 7/1987 | Armand | 429/192 |
| 4,702,974 | 10/1987 | Gregory | 429/50 |
| 5,021,308 | 6/1991 | Armand et al. | |
| 5,072,040 | 12/1991 | Armand | |
| 5,136,097 | 8/1992 | Armand | |
| 5,162,177 | 11/1992 | Armand et al. | |
| 5,260,145 | 11/1993 | Armand et al. | |
| 5,286,808 | 2/1994 | Collins | 528/421 |

FOREIGN PATENT DOCUMENTS 2247692  4/1974  Germany.

OTHER PUBLICATIONS

"Polymer Handbook", 2nd ed., Brandrup, et al. ed., John Wiley & Sons, New York, pp. II–436–437 & 439 (1975).
P. H. Plesch, *Cationic Polymerization and Related Processes*, E. J. Goethals ed., Academic Press, New York, pp. 1–5 (1984).

*Primary Examiner*—D. R. Wilson
*Attorney, Agent, or Firm*—Oblon, Spivak, McClelland, Maier & Neustadt, P.C.

[57] ABSTRACT

The present invention relates to copolymers, to a process for their preparation and to their use for the production of ionically conductive materials. A copolymer according to the invention consists of monomer units corresponding to the formula $-CH_2-O-CHR-CH_2O$ (I) and monomer units corresponding to the formula $-CH_2-CHR'-O-$ (II), in which: R denotes a hydrogen atom, a linear or branched alkyl radical containing from 1 to 8 carbon atoms or a radical $CH_3(-O-CH_2-CH_2)_n-O-CH_2-$, in which $1 \leq n \leq 10$; R' denotes an aliphatic radical containing an unsaturation which can be polymerized by a radical route and inert in the conditions of cationic polymerization. The copolymers can be obtained by cationic polymerization of the appropriate oxirane and dioxolane. Application to the production of ionically conductive materials.

4 Claims, No Drawings

OXIRANE AND DIOXOLANE COPOLYMERS, PROCESS FOR THEIR PREPARATION AND IONIC CONDUCTION MATERIALS CONTAINING SAME

Copolymers of oxirane and dioxolane, process for their preparation and ionically conductive materials containing them.

The present invention relates to copolymers, to a process for their preparation and to their use for the production of ionically conductive materials.

Polymeric electrolytes obtained by dissolving a salt in a solvating polymer containing heteroatoms are known. Such electrolytes, in which the solvent is a poly(ethylene oxide) or an ethylene oxide copolymer, are described, for example, in EP-A-13199 (M. Armand, M. Duclot). These polymeric electrolytes have many applications, in particular in the field of electrochemical generators, light-modulating systems (M. Armand et al., EP-87401555) and sensors, for example for selective or reference membranes (A. Hammou et al., FR-86.09602).

Poly(ethylene oxide) is a semicrystalline polymer which forms stoichiometric complexes with salts. The conductive amorphous phases of these complexes exist only above an eutectic temperature which is generally between 40° C. and 65° C., depending on the nature of the complexed salts. At ordinary temperature good conductivities are obtained only with macromolecular systems which exhibit little or no crystallinity. Much effort has been expended to improve the conductive properties of these materials. This has resulted, for example, in the formation of copolymers based on ethylene oxide (M. Armand et al., FR-83.09886). Copolymerization of ethylene oxide with other epoxides such as propylene oxide or methyl glycidyl ether decreases the crystallinity of the material appreciably. However, random introduction of defects is reflected in a marked loss in solvating and dissociating power of the regular poly(ethylene oxide) sequence. The preparation of copolymers which have high molecular masses, higher than $10^5$, and good mechanical properties, requires reactants of high purity and a reproducible control of the proportion of comonomers introduced is difficult because of the difference in reactivity between ethylene oxide and its homologues.

Amorphous polymers which have good conductivity but mediocre mechanical behaviour have been obtained by polycondensation of the oligooxyethylene glycols ($M_w \approx 200$–1000) with dichloromethane [C. V. Nicholas, D. J. Wilson, C. Booth & R. J. M. Gilles, Brit. Polym. J. 20 289 (1988)]. Furthermore, these materials, which are based on poly(ethylene oxide) do not have any reactive functional groups and cannot therefore be crosslinked.

Dioxolane homopolymers which are highly crystalline and which exhibit melting temperatures close to 55° C. are also known. The conductivity of the polydioxolane/salt complexes at temperatures below 25° C. is therefore mediocre. Furthermore, it is difficult to obtain polymers of high mass by cationic polymerization of dioxolane; the mechanical properties of the electrolytes prepared from these homopolymers are therefore mediocre at temperatures above 80° C.

The objective of the present invention is to provide ionically conductive materials comprising a polymeric solid electrolyte and at the same time exhibiting good conductivity and good mechanical behaviour.

To this end, the subject of the present invention is a class of crosslinkable copolymers which have a low crystallinity.

Another subject of the invention is a process for the preparation of the said copolymers.

Lastly, the subject of the invention is ionically conductive materials in which the solvent consists essentially of an abovementioned copolymer.

A copolymer according to the invention consists of monomer units corresponding to the formula —$CH_2$—O—CHR—$CH_2$—O— (I) and monomer units corresponding to the formula —$CH_2$—CHR'—O— (II), in which:

R denotes a hydrogen atom, a linear or branched alkyl radical containing from 1 to 8 carbon atoms or a radical $CH_3$(—O—$CH_2$—$CH_2$)$_n$—O—$CH_2$—, in which $1 \leq n \leq 10$;

R' denotes an aliphatic radical which has an unsaturation capable of being polymerized by a radical route and inert in the conditions of cationic polymerization.

Among the radicals R, preference is given very particularly to H and $CH_3$.

The radical R' may be selected from those which contain ethylenic unsaturation, such as, for example, alkenyl radicals $CH_2$=CH—($CH_2$)$_q$— in which $1 \leq q \leq 6$ and the radicals $CH_3$—($CH_2$)$_y$—CH=CH—($CH_2$)$_x$— in which $0 \leq x+y \leq 5$ and $0 \leq x$; among these radicals the radical —$CH_2$—$CH_2$—CH=$CH_2$ may be mentioned by way of example. R' may also be selected from allyloxyalkylene radicals containing from 4 to 8 carbon atoms; —$CH_2$—O—$CH_2$—CH=$CH_2$ may be mentioned by way of example. R' may also be selected from acryloyloxyalkylene radicals and methacryloyloxyalkylene radicals, among which —$CH_2$—O—CO—CH=$CH_2$ and —$CH_2$—O—CO—C($CH_3$)=$CH_2$ are particularly preferred.

The monomer units (I) and the monomer units (II) constituting a copolymer of the present invention are derived from a dioxolane and from an oxirane respectively.

When the copolymers of the present invention are intended to be employed as a solvent for ionically conductive materials, the ratio p/(p+m) is preferably between approximately 3% and approximately 30%, more particularly between approximately 5% and approximately 10%, p denoting the number of monomer units (II) and m denoting the number of monomer units (I) constituting a copolymer of the present invention. The copolymer thus obtained has long polydioxolane blocks (40 to 60 monomer units) and short oxirane blocks. However, the overall distribution of the monomer units exhibits a statistical trend.

The copolymers of the present invention can be obtained by cationic polymerization of the appropriate oxirane $\overline{O—CH_2CHR'}$ and dioxolane $\overline{CH_2—O—CHR—CH_2O}$. Various polymerization initiators can be employed, among which there may be mentioned $BF_3(OC_2H_5)_2$, $C_6H_5COX^1$ or $C_6H_5CH_2X^1$ in which $X^1$ denotes $SbF_6$, $PF_6$, $AsF_6$, $BF_4$, $SbF_6$ or $CF_3SO_3$, $SbF_6$ being particularly preferred, or p-$ClC_6H_4N_2Y^1$, $Y^1$ denoting $PF_6$ or $BF_4$.

The cationic polymerization may be performed in bulk, the dioxolane then being used simultaneously as solvent and comonomer. The cationic polymerization may also be performed in a concentrated solution of monomers in an aprotic solvent. Dichloromethane and nitromethane may be mentioned among these solvents.

It is particularly advantageous to add the initiator first of all to the dioxolane and then to introduce only the oxirane, in order to avoid a polymerization of the oxirane molecules alone, which are more reactive towards the cationic polymerization initiator than the dioxolane molecules. The addition of the oxirane may be performed in a single lot, a number of times noncontinuously, or continuously throughout the polymerization period. The latter two methods of addition are preferred because the copolymers obtained give a higher proportion of insolubles after crosslinking.

The copolymers according to the present invention in which the ratio $p/(p+m)$ is between 3% and 30% are particularly useful for the production of ionically conductive materials.

The ionically conductive materials of the present invention consist essentially of an easily dissociable salt and a polymer obtained by crosslinking a copolymer according to the present invention, preferably a copolymer in which ratio $p/(p+m)$ is between approximately 3% and approximately 30%, more particularly between approximately 5% and approximately 10%. The use of this particular category of copolymers makes it possible to restrict the number of points of crosslinking which would stiffen the polymer obtained by crosslinking.

The salt introduced into the copolymer before crosslinking or into the crosslinked polymer is selected from the salts which are usually employed for ionically conductive solid materials. By way of example there may be mentioned the salts $(1/nM)^+X^-$, M denoting a metal cation, or an organic cation of the ammonium, amidinium or guanidinium type, n being the valency of the cation M, X denoting an anion with a delocalized electron charge, for example $Br^-$, $ClO_4^-$, $AsF_6^-$, $R_FSO_3^-$, $(R_FSO_2)_2N^-$ or $(R_FSO_2)_3^-$, $R_F$ denoting a perfluoroalkyl or perfluoroaryl group.

The salt may also be selected from the salts corresponding to the formula $(1/nM)^+[(R_FSO_2)_2CY]^-$ in which Y denotes an electron-withdrawing group selected from —CN and the groups RZ— in which Z denotes a carbonyl group, a sulphonyl group or a phosphonyl group and R denotes a monovalent organic group, M denotes a metal which has the valency n or an organic group which can exist in cationic form, and $R_F$ denotes a perfluoroalkyl or perfluoroaryl group. Such compounds can be prepared by reaction of a compound $(1/nM)^+[(R_FSO_2)_2CH]^-$ with a compound YX in the presence of a nucleophilic aprotic base Nu, X denoting a halogen or a pseudohalogen. These salts and the process for preparing them are described in FR 91.13789 filed on 8.11.1991, to which reference is to be made for further details.

Lithium salts are particularly preferred, more especially $(CF_3SO_2)_2N^-Li^+$ and $(CF_3SO_2)_3C^-Li^+$. Salt mixtures can be employed.

Ionically conductive materials of the present invention may, of course, additionally contain additives which are usually employed in ionically conductive materials, such as plasticizers or stabilizers, depending on the final properties sought after.

In a first embodiment an ionically conductive material is obtained by dissolving the copolymer, the salt and the initiator in a common solvent. The quantity of initiator which is employed is advantageously from 2 to 5% by weight relative to the copolymer. The solvent is selected from volatile solvents; by way of example of such a solvent there may be mentioned acetonitrile, tetrahydrofuran and acetone. The viscous solution obtained is degassed and then spread on a suitable substrate, for example a PTFE plate. After evaporation of the solvent, the film obtained is taken to a temperature of between 70° C. and 120° C., depending on the initiator employed, for 4 hours. The crosslinking initiator may be selected, for example, from benzoyl peroxide, azobisisobutyronitrile (AIBN) or dicumyl peroxide (Dicup). Benzoyl peroxide is particularly preferred.

In another embodiment, the crosslinking of the copolymer is performed in the absence of salt. The copolymer and the initiator are dissolved in a solvent similar to that described above. The solution thus obtained is spread on a substrate and degassed. After evaporation of the solvent, the film obtained is heated in the same way as above. The salt is then introduced into the membrane in the following manner: a highly concentrated solution of the salt in acetonitrile is produced; it is absorbed into the membrane and the solvent is then evaporated off. The quantity of salt which is introduced is determined by the difference between the initial weight of the membrane and its final weight.

In a third embodiment, the crosslinking of a copolymer is performed in the presence of a monomer carrying an ionic group and a group which can be crosslinked by a radical route. The copolymer, the initiator and the monomer carrying an ionic group are dissolved in a solvent similar to that described above. A membrane is then produced as described in the first embodiment, by spreading the solution on a substrate, evaporating the solvent and heating the film obtained in the same way as above. The monomer may be selected from these corresponding to the general formula (1) $ACFX_z^2$—$SO_2Z^2$, in which:

A denotes one of the groups $R^1R^2N$—CO—, $R^3$—O—$CF_2$— or $R^3$—;

$Z^2$ denotes an ionic group;

$X^2$ denotes F, Cl, H or $R_F$;

the radicals $R^1$, $R^2$ and $R^3$, which are identical or different, are selected from nonperfluorinated organic radicals containing a functional group which can be polymerized by a radical route;

$R_F$ is selected from perfluoroalkyl radicals and perfluoroaryl radicals.

The ionic group $Z^2$ is advantageously selected from $1/mM^{m+}[-O]^-$, $1/mM^{m+}[-NSO_2Q]^-$, $1/mM^{m+}[-CH(SO_2Q)]^-$ and $1/mM^{m+}[-C(SO_2Q)_2]^-$, Q denoting —$R_F$ or —CFX—A and $M^{m+}$ denoting an ion of a metal which has the valency m, selected from alkali metals, alkaline-earth metals, transition metals and rare earths or the ammonium, amidinium or guanidinium ions.

When A denotes a group $R^1R^2N$—CO—, the monomers (1) can be prepared by reaction of a sulphonylacetic acid fluoride F—COCFX—$SO_2F$ with an amine $R^1R^2NH$ in the presence of a base.

When A denotes a group $R^3$—O—$CF_2$—, the monomers (1) can be obtained from the sulphonylacetic acid fluoride by a three-stage process: reaction of the sulphonylacetic acid fluoride with a fluoride M'F, bringing the perfluoroalkoxide obtained into contact with a reactant $R^3Y$ to obtain the compound $R^3O$—CF—CFX-$SO_2F$ , reaction of this compound with the appropriate reactant to replace the fluorine of the $SO_2F$ group with an ionic group selected from $1/mM^{m+}[-O]^-$, $1/mM^{m+}[-NSO_2R_F]^{31}$, $1/mM^{m+}[-CH(SO_2R_F]^{31}$ and $1/mM^{m+}[-C(SO_2R_F)_2]^-$.

When the group A is $R^3$—, the monomers (1) are obtained from the sulphonylacetic acid fluoride by a three-stage process. During a first stage the sulphonylacetic acid fluoride is treated with water, which causes a hydrolysis followed by a decarboxylation. The compound obtained has a proton on the α carbon, which exhibits an acidic character permitting the formation of a carbanion which, during a second stage, gives rise to a nucleophilic substitution reaction in the presence of a base. During a third stage the compound obtained is reacted with the appropriate reactant to replace the fluorine of the $SO_2F$ group with an ionic group.

Such monomers are described in FR 92.02027 filed on 21.2.1992, to which reference is to be made for further details. Among the abovementioned monomers, those which are monomers derived from perhalogenated sultones are particularly advantageous.

The ionically conductive materials obtained, consisting of a crosslinked polymer and a salt, can be employed as polymeric solid electrolyte in an electrochemical cell. They are particularly useful for electrochemical generators, rechargeable or otherwise. They are also useful in other electrochemical systems such as electrochromic systems, light-modulating systems and for the production of selective membranes or reference membranes in membrane sensors.

The present invention is illustrated by the following examples given by way of illustration but without any limitation being implied.

EXAMPLE 1

37 g of dioxolane were dissolved in dichloromethane so as to obtain a solution containing 5 moles/liter. To this solution, maintained at −20° C. under argon, were added 1.12 g of benzoyl hexafluoroantimonate in solution in 1,2-epoxy-5-hexene in the form of a solution containing 0.44 mole/liter in dichloromethane, in 0.2 cm$^3$ portions every 20 min. The polymerization is considered to be finished after two hours.

Analysis by gas phase chromatography shows the complete disappearance of the epoxyhexene and the consumption of approximately 90% of the dioxolane. The respective proportions of the two monomers in the copolymer obtained, determined by $^1$H magnetic resonance spectra recorded in CD$_3$CN, are 12% of epoxyhexene and 88% of dioxolane.

After deactivation of the macromolecular chains by addition of a solution of sodium ethanolate in ethanol at a concentration 5 times greater than that of the initiator, the copolymer obtained is purified by dissolving in tetrahydrofuran and precipitation in pentane. The precipitate is filtered off and then dried in vacuum at 40° C.

The molecular masses, expressed as polystyrene equivalent, were determined by steric exclusion chromatography performed in THF using a set of three Ultrastyragel® columns (marketed by the Micropore company) which had a porosity of 500, 10$^3$ and 10$^4$ Å respectively. They are: Mw=68,000 g/mol and Mn=19,000 g/mol.

Differential scanning calorimetry (DSC) analysis of the sample shows the presence of two melting peaks at 29° C. and 40° C. After melting and quenching of the sample the thermogram no longer shows any crystalline phase and the measured glass transition temperature is 209 K.

EXAMPLE 2

4 g of the copolymer obtained in Example 1 are dissolved in acetonitrile and 80 mg of benzoyl peroxide are added to it. The solution is spread on a substrate and degassed. After evaporation of the solvent a membrane is obtained which is heated to 70° C. for 4 hours and then washed in a Soxhlet with acetonitrile for 24 hours. 90% of the copolymer is thus found to have been effectively crosslinked. The DSC thermogram no longer shows any melting peak and the measured glass transition temperature is 217 K.

The incorporation of lithium bis(trifluorosulphonyl)imide in this membrane (with an oxygen/lithium concentration ratio of 14) makes it possible to obtain a polymeric electrolyte which is stable up to a temperature of 250° C., as demonstrated by the thermogravimetric analysis carried out under helium, the said polymeric electrolyte being completely amorphous in the temperature region explored (200 to 450 K) with a glass transition temperature of 235 K.

The conductivity is 2×10$^{-6}$ S/cm at 5° C., 4×10$^{-5}$ S/cm at 25° C. and reaches 10$^{-3}$ S/cm at 70° C. The electrochemical stability region in respect of lithium is 4.5 volts.

EXAMPLE 3

1.5 g of the copolymer obtained in Example 1 were dissolved in 5 ml of acetonitrile; 0.205 g of (CF$_3$SO$_2$)$_2$NLi (O/Li=30) and 0.06 g of AIBN were added. After degassing, the viscous solution is cast in a glass ring placed on a 10-cm$^2$ PTFE plate. After evaporation of the solvent the membrane is kept at 75° C. for 5 hours to complete the crosslinking. The film obtained exhibits a conductivity of 6×10$^{-6}$ S/cm at 5° C., 9×10$^{-5}$ S/cm at 30° C. and 2×10$^{-3}$ S/cm at 65° C.

EXAMPLE 4

1.17 g of monomer (CH$_2$=CH—CH$_2$)$_2$NCO—C(CF$_3$)F—SO$_3$Li and 0.100 g of benzoyl peroxide were added to a solution in acetonitrile of 2 g of a dioxolane/1,2-epoxy-5-hexene copolymer containing 7 mol % of epoxyhexene and with a mass Mn=17,000 g/mol. The viscous solution obtained was cast in a glass ring placed on a 10-cm$^2$ PTFE plate. After evaporation of the solvent the membrane is kept at 70° C. for 4 hours to complete the crosslinking. A film which has good mechanical behaviour is obtained. After washing the film with acetonitrile in a Soxhlet, analysis of the washing extracts shows that all the salt introduced has been incorporated into the crosslinked polymer. DSC analysis shows the absence of any crystalline phase. The measured glass transition temperature is −61° C.

An electrolyte with a grafted anion has thus been obtained exhibiting a conductivity of 10$^{-6}$ S/cm at 25° C. and of 10$^{-4}$ S/cm at 70° C.

EXAMPLE 5

An electrochemical generator was produced comprising a lithium negative electrode, an ionically conductive material according to the invention as electrolyte and a composite positive electrode.

The negative electrode consisted of a layer of lithium which had a thickness of 50 μm, deposited on an 8-μm polypropylene film metallized with a 100-nm layer of nickel.

The electrolyte was obtained as follows. A copolymer similar to that employed in Example 4 was heated to 40° C. and then 3% by weight of benzoyl peroxide and 35% by weight of (CF$_3$SO$_2$)$_2$NLi salt were added to it without using solvent, the atomic ratio O/Li being 14. The mixture was spread on a 30-μm polypropylene film. After heating for 4 hours at 80° C., a film with a thickness of 55 μm was separated from the substrate and placed on the lithium electrode in a glove box under argon atmosphere.

The positive electrode employed consisted of a composite material containing 45% by volume of lithium manganite LiMn$_2$O$_4$ of spinel structure as particles of approximately 8 μ, 5% by volume of acetylene black and 50% by volume of a material obtained by incorporating the salt (CF$_3$SO$_2$)$_2$NLi into a copolymer similar to that employed for the electrolyte but not crosslinked, in a proportion of 35% by weight of salt relative to the copolymer.

The various constituents were mixed at 50° C. without solvent addition and the mixture was then spread on a current collector similar to that of the negative electrode.

A flexible generator was thus obtained with a thickness of 190 μm, which had an e.m.f. of 3 volts and a current of 400 A/cm$^2$ at 50° C. at a voltage of 2.8 volts.

We claim:

1. A copolymer, consisting of monomer units corresponding to the formula: —(CH$_2$—O—CHR—CH$_2$—O)—(I) and of monomer units corresponding to the formula —(CH$_2$—CHR'—O—)—(II), in which:

R is a hydrogen atom, a linear or branched alkyl radical containing from 1 to 8 carbon atoms or a radical of the formula:

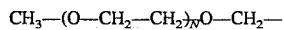

CH$_3$—(O—CH$_2$—CH$_2$)$_N$O—CH$_2$— wherein $1 \leq n \leq 10$;

R' is a radical of the formula CH$_2$=CH—(CH$_2$)$_q$—, wherein $1 \leq q \leq 6$, or the radical CH$_3$ —(CH$_2$)$_y$—CH=CH—(CH$_2$)$_x$—, wherein $0 \leq x+y \leq 5$; and wherein the amount of monomer unit (II) in the copolymer is sufficient for crosslinking of the copolymer.

2. The copolymer of claim 1, wherein R is hydrogen or methyl.

3. The copolymer of claim 1, wherein:

$0.03 < p/m+p < 0.3$, wherein p is the number of monomer units (II) and m is the number of monomer units (I), constituting the copolymer.

4. The copolymer of claim 2, wherein $0.05 < p/m+p < 0.1$.

* * * * *